US012640777B2

(12) United States Patent
Kim et al.

(10) Patent No.: US 12,640,777 B2
(45) Date of Patent: May 26, 2026

(54) METHOD FOR INTEGRATING IRS SYSTEM INTO MOBILE DEVICE, AND IRS SYSTEM

(71) Applicant: RESEARCH COOPERATION FOUNDATION OF YEUNGNAM UNIVERSITY, Gyeongsan-si (KR)

(72) Inventors: Sung Won Kim, Daegu (KR); Adeel Iqbal, Gyeongsan-si (KR)

(73) Assignee: RESEARCH COOPERATION FOUNDATION OF YEUNGNAM UNIVERSITY, Gyeongsan-si (KR)

( * ) Notice: Subject to any disclaimer, the term of this patent is extended or adjusted under 35 U.S.C. 154(b) by 37 days.

(21) Appl. No.: 18/827,440

(22) Filed: Sep. 6, 2024

(65) Prior Publication Data

US 2025/0385714 A1 Dec. 18, 2025

(30) Foreign Application Priority Data

Jun. 12, 2024 (KR) ........................ 10-2024-0076175

(51) Int. Cl.
*H04B 7/04* (2017.01)

(52) U.S. Cl.
CPC ................................ *H04B 7/04013* (2023.05)

(58) Field of Classification Search
CPC .................................................. H04B 7/04013
See application file for complete search history.

(56) References Cited

U.S. PATENT DOCUMENTS

| | | | |
|---|---|---|---|
| 2024/0098516 A1* | 3/2024 | Yildiz | H04W 16/20 |
| 2024/0413886 A1* | 12/2024 | Yoshioka | H04B 7/155 |

FOREIGN PATENT DOCUMENTS

| | | |
|---|---|---|
| CN | 117941279 A | 4/2024 |
| KR | 10-2022-0030883 A | 3/2022 |
| KR | 10-2023-0142438 A | 10/2023 |
| KR | 10-2619700 B1 | 12/2023 |
| KR | 10-2024-0072065 A | 5/2024 |

OTHER PUBLICATIONS

Lee, Mi-Hyun, KIPO: "Office Action for Korean Application No. 10-2024-0076175", Feb. 25, 2026, KIPO, Republic of Korea.

* cited by examiner

*Primary Examiner* — Sung S Ahn
(74) *Attorney, Agent, or Firm* — Bridgeway IP Law Group, PLLC; Sang Ho Lee; Hyun Woo Shin

(57) ABSTRACT

An intelligent reflecting surfaces (IRS) system includes a plurality of reflectors for reflecting or refracting a reception signal according to characteristics thereof, a controller configured to control the characteristics of the plurality of reflectors to either reflect or refract the reception signal in a direction toward an antenna of a mobile device, and a substrate with a front side on which the plurality of reflectors arranged in a predetermined shape and the controller are mounted. The controller is designed to control the characteristics of the plurality of reflectors to maximize an area of the antenna to receive the reception signal, and the substrate is integrated into the mobile device.

16 Claims, 7 Drawing Sheets

110

120

130

140

Devices with
Good Coverage

Devices with
Average Coverage

Devices with Below
Average Coverage

IRS Integrated Devices
(Improved Coverage)

101

Buildings with antennas for
coverage improvements

Obstacles in
coverage

6G Base
Stations

Reflecting element   Controller   Substrate
(a)

Dielectric   Trace   Ground plane
(b)

(a)  (b)  (c)

Reflecting element 403
401

Antenna

Substrate

Controller (a)          (b)          (c)

Camera & sensor

Buttons

Reflecting element

IRS system

Substrate

Controller

Reflecting element

IRS system

Substrate

Controller

METHOD FOR INTEGRATING IRS SYSTEM INTO MOBILE DEVICE, AND IRS SYSTEM

CROSS-REFERENCE TO RELATED APPLICATION(S)

The present application claim priority to Korean patent application No. 10-2024-0076175 filed on Jun. 12, 2024, the entire contents of which is incorporated by reference herein.

BACKGROUND OF THE INVENTION

Field of the Invention

The present disclosure relates to a method of integrating an Intelligent Reflecting Surfaces (IRS) system into a mobile device, and the IRS system.

Background of the Related Art

The ceaseless advancement in cellular communication techniques has led to an innovative connectivity era characterized by the evolutionary trajectory toward the 5-th and 6-th Generation (5G/6G) network era. Each generation has a characteristic of constant pursuit of higher data rates, reduced waiting time, and ubiquitous connectivity, and requires innovative solutions to overcome new challenges. As the emergence of 6G networks is divided into utilization of mmWave and terahertz (THz) frequencies, the importance of pervasive coverage is getting more and more important.

However, the propagation characteristic unique to these high-frequency bands should seek new strategies to solve the fundamental challenges by removing strong obstacles to achieving comprehensive network accessibility. Frequencies of high-frequency bands such as mmWave and THz are known for the potential of providing very high data rates but suffer from low coverage as the loss in the path is very easy, and it is very difficult to penetrate obstacles such as walls.

Therefore, research on innovative approaches in the deployment of mmWave and THz frequencies are required to extend coverage and guarantee reliable connectivity in cellular networks, while it is promising from the aspect of data rates.

SUMMARY OF THE INVENTION

Therefore, the present disclosure has been made in view of the above problems, and it is an object of the present disclosure to provide a method of integrating an Intelligent Reflecting Surfaces (IRS) system into a mobile device, and the IRS system.

To accomplish the above object, according to one aspect of the present disclosure, there is provided an intelligent reflecting surfaces (IRS) system comprising: a plurality of reflectors for reflecting or refracting a reception signal according to predetermined characteristics; a controller for controlling the characteristics of the reflectors so that the reception signal is reflected or refracted in a direction toward an antenna of the mobile device; and a substrate with a front side on which the plurality of reflectors arranged in various shapes and the controller are mounted, wherein the controller controls the characteristics of the reflectors so that the reception signal is received by the mobile device using a maximum area of the antenna, and the substrate is integrated into the mobile device.

To accomplish the above object, according to another aspect of the present disclosure, there is provided a method of integrating an Intelligent Reflecting Surfaces (IRS) system configured of a plurality of reflectors, a controller, and a substrate into a mobile device, the method comprising the steps of: reflecting or refracting a reception signal according to predetermined characteristics, by the reflectors; and controlling the characteristics of the reflectors so that the reception signal is reflected or refracted in a direction toward an antenna of the mobile device, by the controller, wherein the controller controls the characteristics of the reflectors so that the reception signal is received by the mobile device using a maximum area of the antenna, and the substrate, in which the plurality of reflectors arranged in various shapes and the controller are mounted on a front side, is integrated into the mobile device.

According to one aspect of the present disclosure described above, as a method of integrating an IRS system into a mobile device and the IRS system are provided, coverage limit related to mm Wave and THz frequencies can be resolved, and numerous additional advantages can be provided.

In addition, as the IRS system is integrated into a mobile device seamlessly, the overall efficiency and performance of cellular networks may be improved, and as the usage of the rear cover of the mobile device is changed to an essential component of an antenna system, utilization of resources is optimized, and a sustainable solution that optimizes resource utilization and minimizes environmental impact is provided.

DETAILED DESCRIPTION OF THE PREFERRED EMBODIMENT

Figure 1:
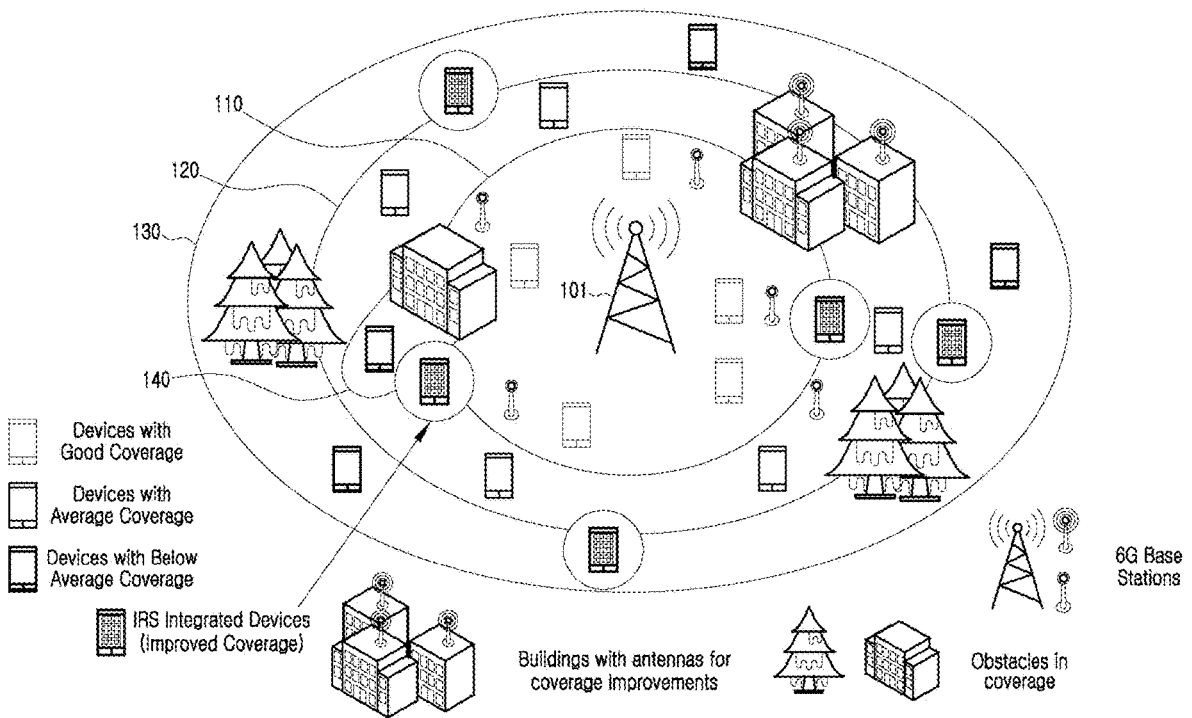
FIG. 1 is a view illustrating an example of coverage according to the influence of obstacles and distance in a 5G/6G cellular communication system.

The detailed description of the present disclosure is described below with reference to the accompanying drawings, which shows, as an example, specific embodiments in which the present disclosure may be embodied. These embodiments are described in detail as sufficient as to embody the present disclosure by those skilled in the art. It should be understood that although the various embodiments of the present disclosure are different from one another, they are not necessarily mutually exclusive. For example, specific shapes, structures and characteristics described herein may be implemented in other embodiments without departing from the spirit and scope of the present disclosure in relation to an embodiment. In addition, it should be understood that the location or arrangement of individual components within each disclosed embodiment may be changed without departing from the spirit and scope of the present disclosure. Accordingly, the detailed description described below is not intended to be taken in a limiting sense, and the scope of the present disclosure is limited, if properly described, only by the appended claims, together with all the scopes equivalent to those claimed in the claims. In the drawings, similar reference numerals refer to identical or similar functions across several aspects.

Components according to the present disclosure are components defined not by physical classification but by functional classification, and may be defined by the functions performed by each component. Each component may be implemented as hardware or program codes and processing units that perform respective functions, and functions of two or more components may be implemented to be included in one component. Therefore, the names given to the components in the following embodiments are not to physically distinguish each component, but to imply a representative function performed by each component, and it should be noted that the technical spirit of the present disclosure is not limited by the names of the components.

Hereinafter, preferred embodiments of the present disclosure will be described in more detail with reference to the drawings.

FIG. 1 is a view illustrating an example of coverage according to the influence of obstacles and distance in a 5G/6G cellular communication system.

The illustrated 5G/6G cellular communication system includes a first area 110, a second area 120, and a third area 130 configured around a base station 101.

Here, the first area 110 means an area of good reception signal strength as the distance to the base station 101 is relatively close, and accordingly, mobile devices located in the first area 110 have good coverage.

The second area 120 means an area of average reception signal strength as the distance to the base station 101 is greater than that of the first area 110, and accordingly, mobile devices located in the second area 120 have average coverage.

The third area 130 means an area where the reception signal strength is lower than the average as the distance to the base station 101 is greater than that of the second area 120, and accordingly, mobile devices located in the third area 130 have coverage lower than the average.

Meanwhile, in the 5G/6G cellular communication system, signals may be blocked for various reasons such as buildings, trees, tunnels, user's mobility, and the like, and blind spots 140 may occur due to such signal blocking. The blind spot means an area of very low signal strength within a cellular coverage or an area outside the cellular coverage.

Therefore, the present disclosure proposes a method of integrating an IRS system into mobile devices and the IRS system to improve the coverage of mobile devices located in blind spots or mobile devices located in an area where reception signal strength is lower than the average.

Figure 2:
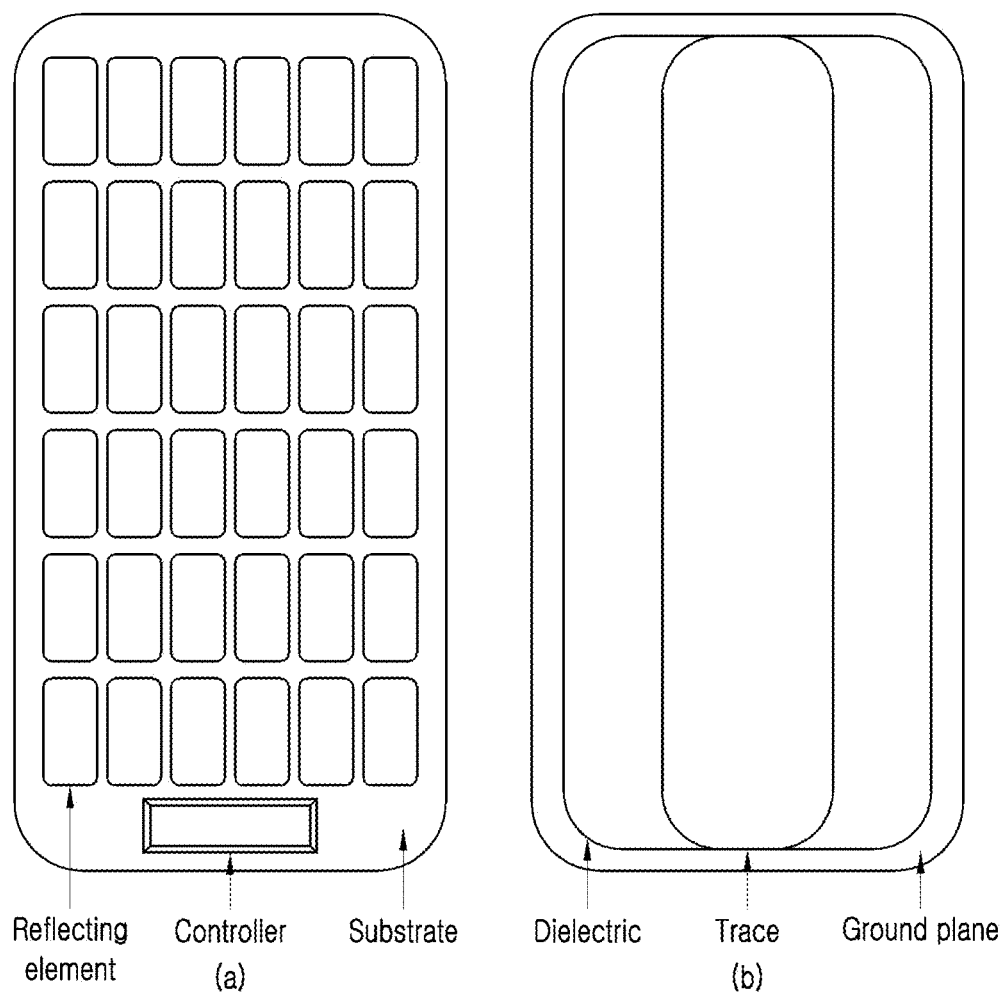
FIG. 2 is a view showing the front and rear sides of an IRS system according to an embodiment of the present disclosure.

FIG. 2 is a view showing the front and rear sides of an IRS system according to an embodiment of the present disclosure.

FIG. 2(*a*) is a view showing the front side of the IRS system, and the illustrated IRS system is configured with a plurality of reflectors, a controller, and a substrate. Here, the reflectors reflect or refract reception signals according to predetermined characteristics, the controller controls the characteristics of the reflectors so that the reception signals are reflected or refracted in the direction toward the antenna of the mobile device, and the plurality of reflectors arranged in various shapes and the controller are mounted on the front side of the substrate.

FIG. 2(*b*) is a view showing the rear side of the IRS system, and is configured of a printed circuit board (PCB) dielectric, a trace, and a ground plane. Here, the PCB dielectric provides electrical insulation between traces and a gap between conductive layers, the trace supplies power by transmitting electrical signals, and the ground plane provides a common voltage reference point to guarantee stable operation.

FIG. 2(*a*) is a view showing an example of a case where a plurality of reflectors is arranged in a rectangular shape to utilize the area of the substrate to the maximum, and of course, the plurality of reflectors may be arranged in various shapes according to application examples.

Figure 3:
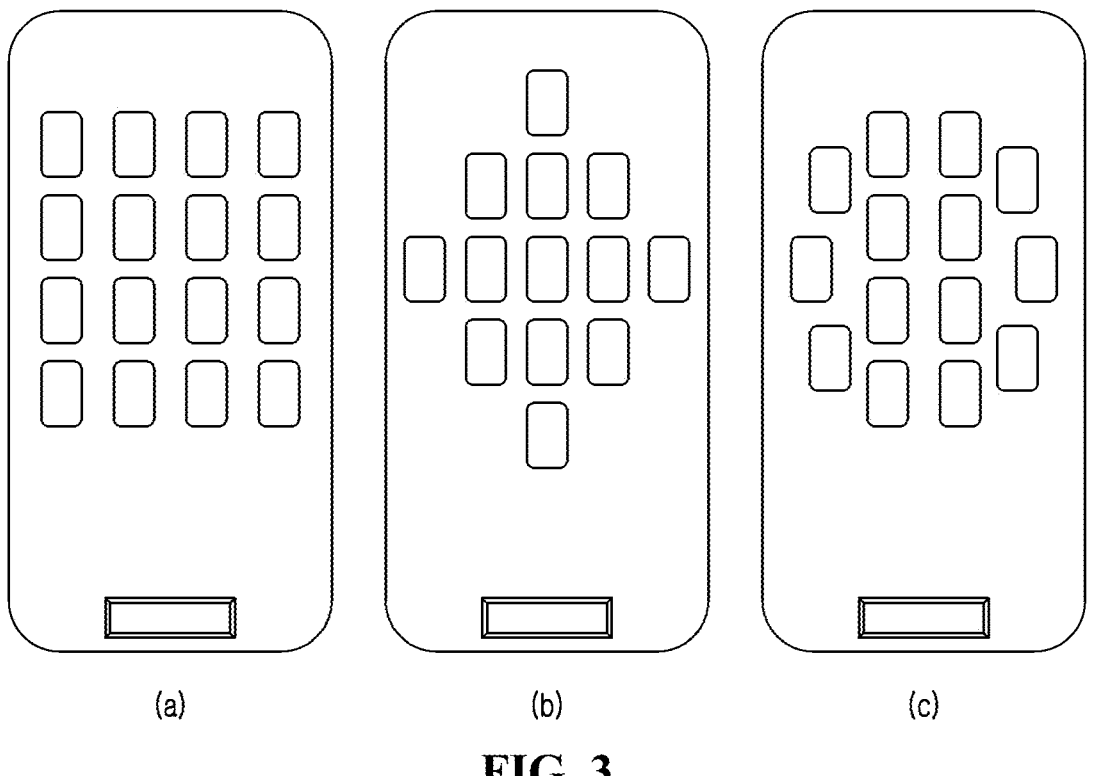
FIG. 3 is a view showing an example of arranging reflectors in an IRS system according to an embodiment of the present disclosure.

FIG. 3 is a view showing an example of arranging reflectors in an IRS system according to an embodiment of the present disclosure.

FIG. 3(*a*) is a view showing an example of arranging the reflectors in a rectangular shape. FIG. 3(*b*) is a view showing an example of arranging the reflectors of FIG. 3(*a*) in a shape rotated by 45 degrees, i.e., in a diamond shape, and FIG. 3(*c*) is a view showing an example of arranging the reflectors in a circular shape. These reflectors may be arranged in various shapes such as triangular, oval, hexagonal, octagonal, spiral, and irregular shapes, as well as the rectangular, square, diamond, and circular shapes shown in FIGS. 2 and 3, and each shape may be selected according to specific design requirements and application fields. In addition, as these various shapes are appropriately utilized, the arrangement and characteristics of the reflectors can be optimized, and the performance of the IRS system can be maximized.

Figure 4:
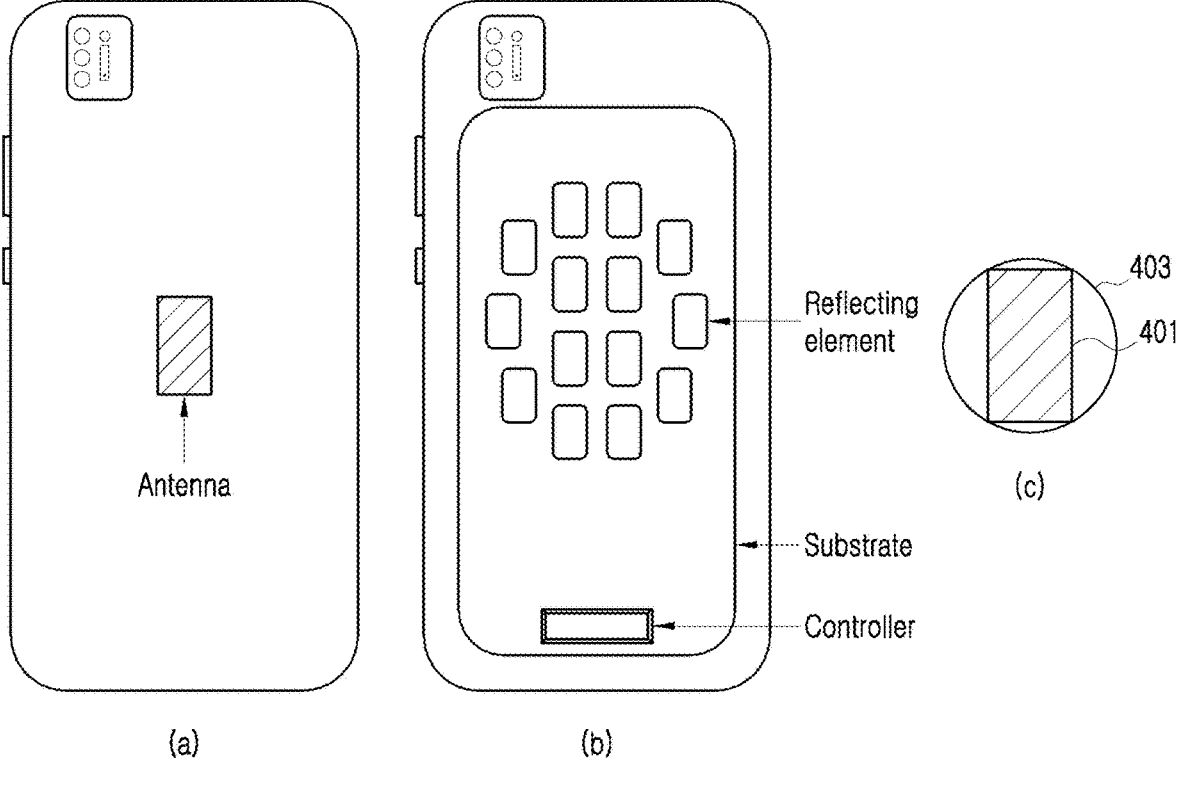
FIG. 4 is a view illustrating the operation of a controller that controls the characteristics of a reflector so that a reception signal is received by a mobile device using the maximum area of an antenna in an IRS system according to an embodiment of the present disclosure.

FIG. 4 is a view illustrating the operation of a controller that controls the characteristics of a reflector so that a reception signal is received by a mobile device using the maximum area of an antenna in an IRS system according to an embodiment of the present disclosure.

FIG. 4(*a*) is a view showing an example of an antenna mounted inside a mobile device at a portion where the rear side housing is removed. FIG. 4(*b*) is a view showing an example of integrating an IRS system configured with a plurality of reflectors, a controller, and a substrate in the rear side housing of a mobile device.

Although a rectangular antenna extended in the vertical direction is assumed in FIG. 4(*a*) for convenience of explanation, it goes without saying that the antenna may be designed in any other shapes, including a polygonal shape.

The controller of the IRS system shown in FIG. 4(*b*) controls the characteristics of the reflectors so that the reception signal received through the reflectors is received by the mobile device using the maximum area of the antenna shown in FIG. 4(*a*). Here, the controller receives power from the battery of the mobile device.

More specifically, the controller divides the antenna area as many as the number of reflectors constituting the IRS system, and controls the characteristics of the reflectors so that the reception signal received through each reflector may be reflected or refracted toward each divided antenna area. At this point, each reflector has a one-to-one correspondence to each divided antenna area, and accordingly, as the reception signal received through each reflector is reflected or refracted toward a corresponding antenna area, the mobile device may receive the signal by evenly using the entire area of the antenna.

As another method, the controller applies a scale proportional to the antenna area to the area where the reflectors are arranged in the IRS system, and controls the characteristics of the reflectors considering the reflector area where the scale is applied and the antenna area.

At this point, when it is assumed that the reflectors are arranged in a circular shape, the scaled reflector area looks like reference numeral 403 in FIG. 4(*c*), and the antenna area looks like reference numeral 401, the controller controls the characteristics of the reflectors so that the reception signal received through the reflectors included in an area overlapped with the antenna area in the scaled reflector area is reflected or refracted toward the antenna areas corresponding to the locations of the reflectors.

In addition, the controller controls the characteristics of the reflectors so that the reception signal received through the reflectors included in an area not overlapped with the antenna area is reflected or refracted toward an antenna area close to the locations of the reflectors.

The characteristics of the reflectors include a phase and an amplitude, and therefore, the controller controls the phase of the reflectors to adjust the reflected or refracted direction of the reception signal, and controls the amplitude of the reflectors to adjust the intensity of the reflected or refracted reception signal. At this point, the reflected or refracted direction of the reception signal may be set using an azimuth and an elevation.

Figure 5:
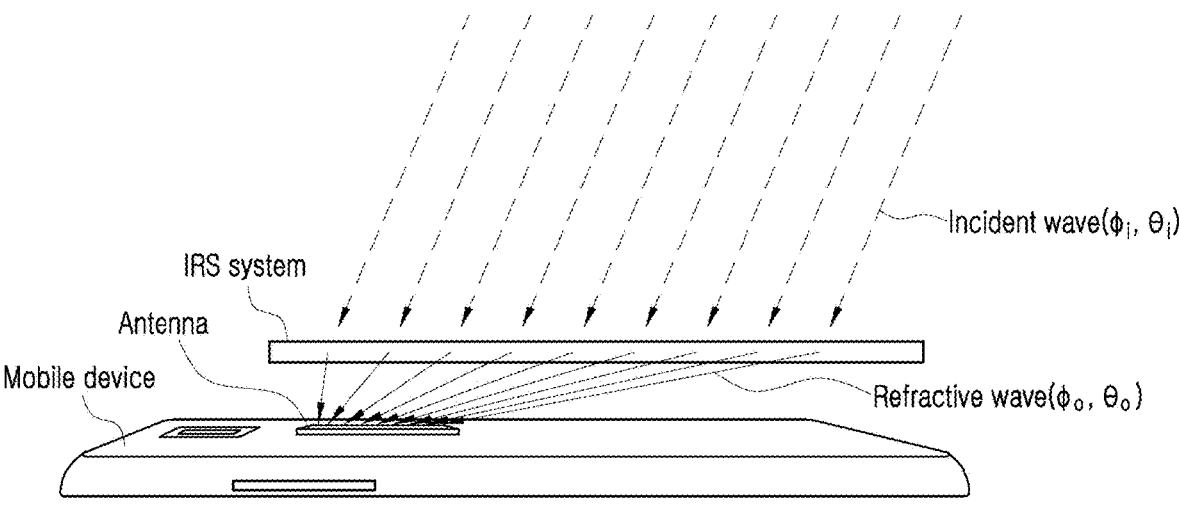
FIG. 5 is a view showing an example of integrating an IRS system with an antenna through a wireless connection according to an embodiment of the present disclosure.
Figure 6:
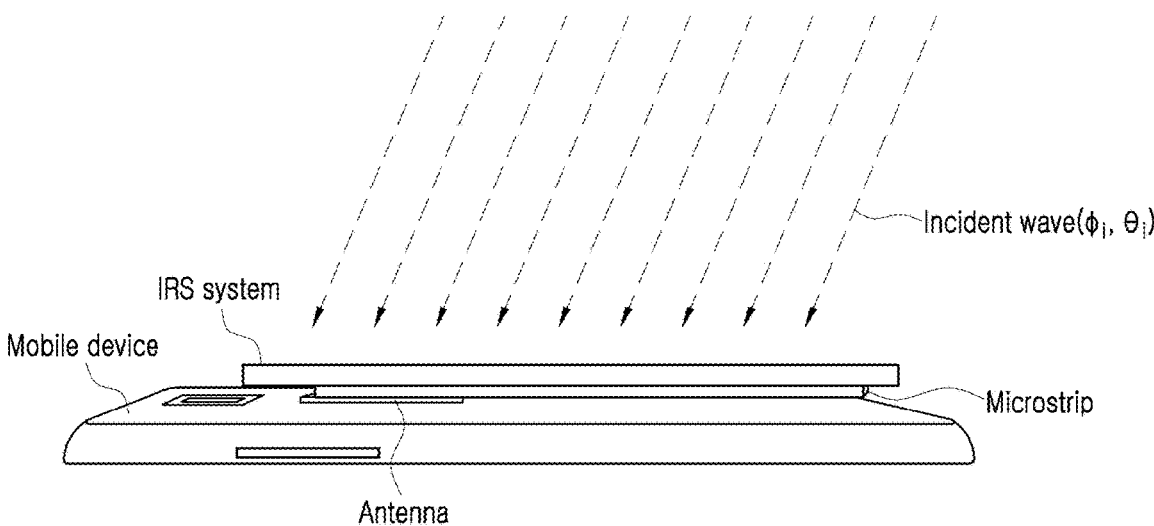
FIG. 6 is a view showing an example of integrating an IRS system with an antenna through a wired connection according to an embodiment of the present disclosure.

Meanwhile, the substrate of the IRS system may be integrated with the internal antenna of the mobile device in two ways as shown in FIGS. 5 and 6, and this will be described below.

FIG. 5 is a view showing an example of integrating an IRS system with an antenna through a wireless connection according to an embodiment of the present disclosure.

The IRS system is mounted on the rear side of the mobile device and is located very close to the internal antenna of the mobile device to maintain a consistent line-of-sight (LOS). This proximity may guarantee optimal performance of the IRS system by minimizing potential signal loss or performance degradation.

In this way, the substrate constituting the IRS system is physically separated from the antenna and integrated with the antenna of the mobile device.

In addition, the IRS system configured of a plurality of reflectors receives incident waves characterized by the azimuth angle ($\phi$) and elevation angle ($\theta$) through the reflectors and dynamically adjusts the characteristics of the incident waves through the controller to reflect or refract the incident waves toward the antenna. In this way, the IRS system improves signal strength and quality and optimizes the reception performance of the mobile device by focusing the reception signal on the antenna.

FIG. 6 is a view showing an example of integrating an IRS system with an antenna through wired connection according to an embodiment of the present disclosure.

The IRS system is physically connected to the antenna of the mobile device through a microstrip, and here, the microstrip is mounted on the rear side of the substrate, i.e., the rear side of a surface where the reflectors and the controller are mounted.

The microstrip is a conductive pathway that physically connects the IRS system to the antenna of the mobile device, and is strategically arranged to connect each of the reflectors constituting the IRS system to the antenna to guarantee smooth transmission of reflected or refracted signals. In addition, the microstrip provides a direct and efficient conduit for signals to minimize signal loss and degradation and improve the overall performance of the IRS system.

Figure 7:
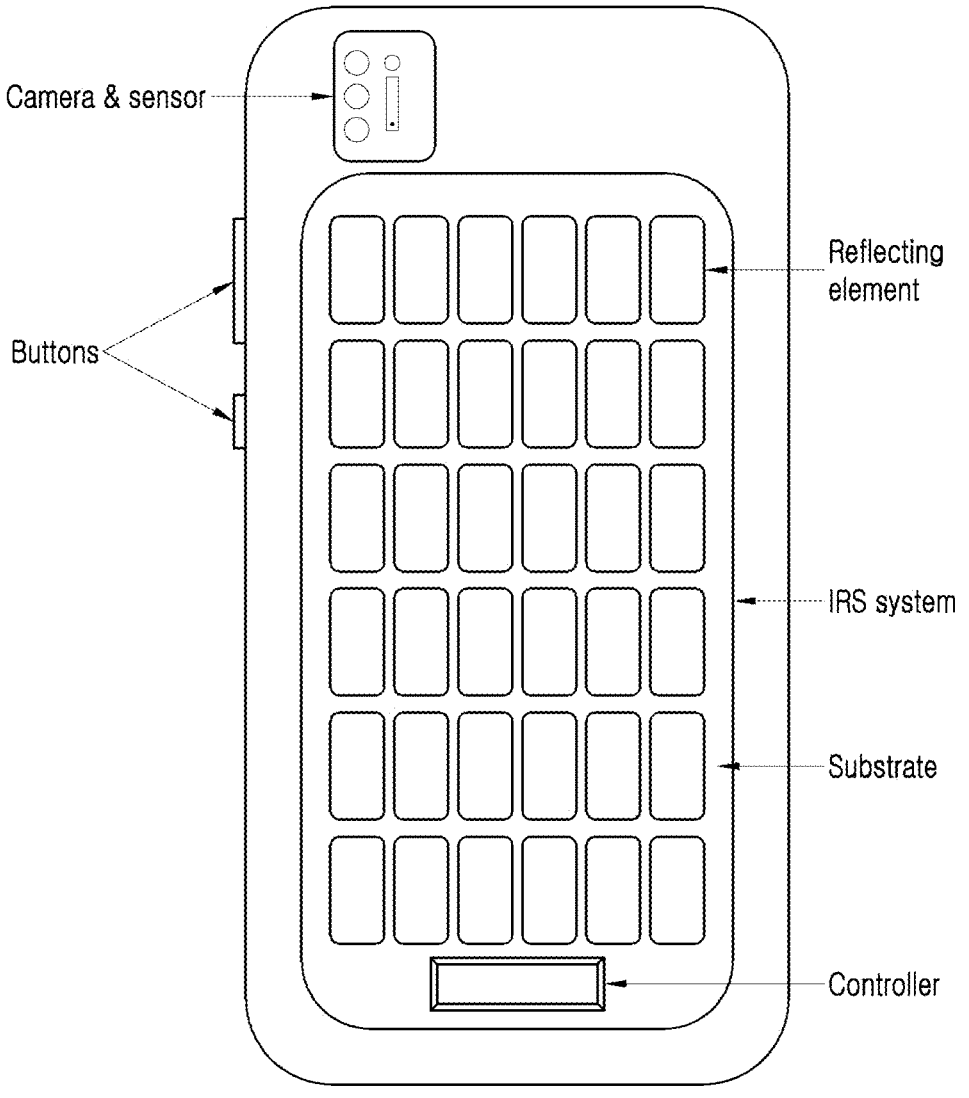
FIG. 7 is a view showing an example of integrating an IRS system into the rear housing of a mobile device according to an embodiment of the present disclosure.
Figure 8:
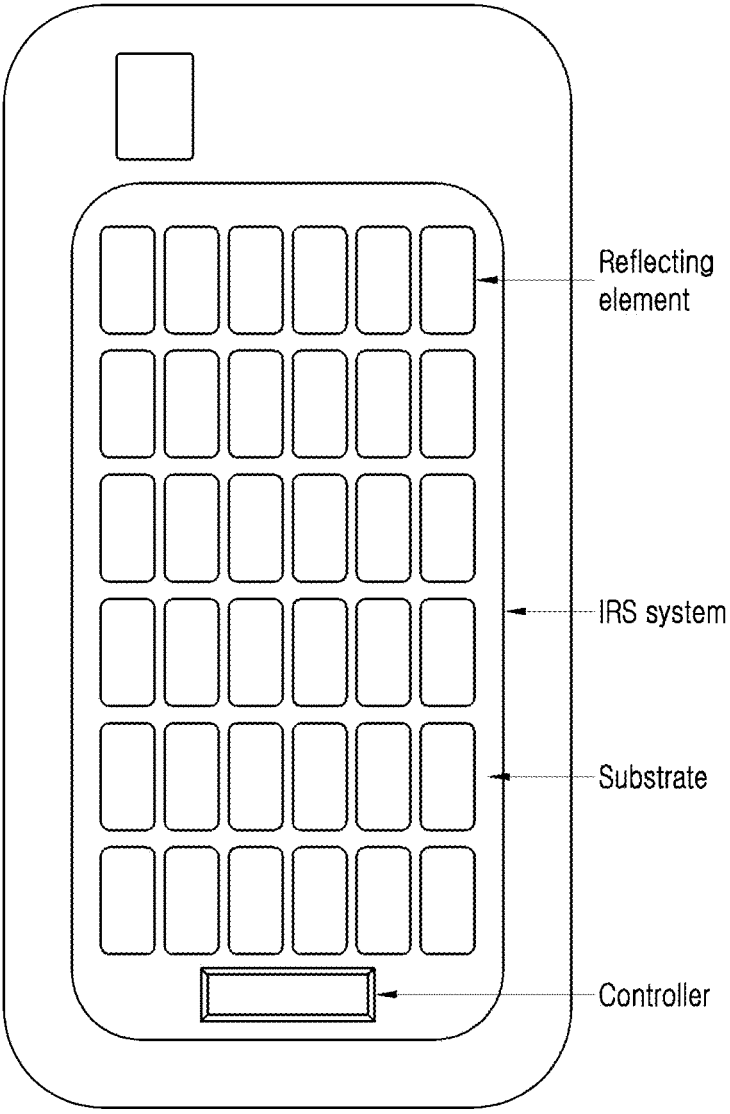
FIG. 8 is a view showing an example of manufacturing an IRS system in the form of a separate cover according to an embodiment of the present disclosure.

FIG. 7 is a view showing an example of integrating an IRS system into the rear housing of a mobile device according to an embodiment of the present disclosure, and FIG. 8 is a view showing an example of manufacturing an IRS system in the form of a separate cover according to an embodiment of the present disclosure.

In this way, the IRS system may be mounted on the rear housing of the mobile device or may be manufactured as a separate cover to be selectively mounted on the rear side of the mobile device as needed by a user.

The method of integrating an IRS system into a mobile device of the present disclosure as described above may be implemented in the form of program instructions that can be executed through various computer components and recorded in a computer-readable recording medium. The computer-readable recording medium may store program instructions, data files, data structures, and the like alone or in combination.

The program instructions recorded in the computer-readable recording medium may be specially designed and configured for the present disclosure or may be known to and used by those skilled in the field of computer software.

Examples of the computer-readable recording medium include magnetic media such as hard disks, floppy disks, and magnetic tapes, optical media such as CD-ROMs and DVDs, magneto-optical media such as floptical disks, and hardware devices specially configured to store and execute program instructions, such as ROM, RAM, flash memory, and the like.

Examples of the program instructions include high-level language codes that can be executed by a computer using an interpreter or the like, as well as machine language codes such as those produced by a compiler. The hardware devices described above may be configured to operate as one or more software modules to perform the processes according to the present disclosure, and vice versa.

Although various embodiments of the present disclosure have been shown and described above, the present disclosure is not limited to the specific embodiments described above, and of course, various modified embodiments are possible by those skilled in the art without departing from the gist of the present disclosure claimed in the claims, and these modified embodiments should not be individually understood from the technical spirit or prospect of the present disclosure.

What is claimed is:

1. An intelligent reflecting surfaces (IRS) system comprising:

a plurality of reflectors for reflecting or refracting a reception signal according to characteristics thereof;

a controller configured to control the characteristics of the plurality of reflectors to either reflect or refract the reception signal in a direction toward an antenna of a mobile device; and a substrate with a front side on which the plurality of reflectors arranged in a predetermined shape and the controller are mounted, wherein the controller controls the characteristics of the plurality of reflectors to maximize an area of the antenna to receive the reception signal, and the substrate is integrated into the mobile device.

2. The IRS system, according to claim 1, wherein the controller is configured to divide the area of the antenna into a plurality of divided antenna areas corresponding to a number of the plurality of reflectors and controls each of the characteristics of the plurality of reflectors, reflecting or refracting the reception signal received through each of the plurality of reflectors toward each of the plurality of divided antenna areas, respectively.

3. The IRS system according to claim 1, wherein the controller aligns by scaling down arrangements of the plurality of reflectors with the area of the antenna, distinguishing between overlapping reflectors and non-overlapping reflectors within the area of the antenna, the controller is configured to control the characteristics of the plurality of reflectors to reflect or refract the reception signal, received via the overlapping reflectors, toward the area of the antenna corresponding to locations of the plurality of reflectors, and to control the characteristics of the plurality of reflectors to reflect or refract the reception signal, received via the non-overlapping reflectors, toward the area of the antenna close to locations of the plurality of reflectors.

4. The IRS system according to claim 1, wherein the controller is configured to control a phase of the plurality of reflectors to adjust a reflected or refracted direction of the reception signal, and to control an amplitude of the plurality of reflectors to adjust intensity of the reception signal, wherein the reflected or refracted direction of the reception signal is set using an azimuth and an elevation.

5. The IRS system according to claim 1, wherein the substrate is physically separated from the antenna, and maintains line-of-sight (LOS) with the mobile device.

6. The IRS system according to claim 1, wherein the substrate is physically connected to the antenna through a microstrip, and the microstrip is mounted on a rear side of the substrate.

7. The IRS system according to claim 1, wherein the substrate is integrated into a rear housing of the mobile device.

8. The IRS system according to claim 1, wherein the substrate is manufactured in a form of a separate cover and mounted on a rear side of the mobile device.

9. A method of integrating an Intelligent Reflecting Surfaces (IRS) system configured of a plurality of reflectors, a controller, and a substrate into a mobile device, the method comprising:

reflecting or refracting, by the reflectors, a reception signal according to predetermined characteristics; and controlling, by the controller, the characteristics of the plurality of reflectors to either reflect or refract the reception signal in a direction toward an antenna of a mobile device, wherein the substrate has a front side on which the plurality of reflectors arranged in a predetermined shape and the controller are mounted, and the controller controls the characteristics of the reflectors to maximize an area of the antenna to receive the reception signal, and the substrate is integrated into the mobile device.

10. The method according to claim 9, wherein the controlling the characteristics of the plurality of reflectors includes dividing the area of the antenna into a plurality of divided antenna areas corresponding to a number of the reflectors and controlling each of the characteristics of the reflectors, reflecting or refracting the reception signal received through each of the reflectors toward each of the plurality of divided antenna areas, respectively.

11. The method according to claim 9, wherein the controlling the characteristics of the plurality of reflectors includes aligning by scaling down arrangements of the reflectors with the area of the antenna, distinguishing between overlapping reflectors and non-overlapping reflectors within the area of the antenna, the controlling the characteristics of the reflectors to reflect or refract the reception signal, received via the overlapping reflectors, toward the area of the antenna corresponding to locations of the reflectors, and to control the characteristics of the reflectors to reflect or refract the reception signal, received via the non-overlapping reflectors, toward the area of the antenna close to locations of the reflectors.

12. The method according to claim 9, wherein the controlling the characteristics of the plurality of reflectors includes controlling a phase of the reflectors to adjust a reflected or refracted direction of the reception signal, and to control an amplitude of the reflectors to adjust intensity of the reception signal, wherein the reflected or refracted direction of the reception signal is set using an azimuth and an elevation.

13. The method according to claim 9, wherein the substrate is physically separated from the antenna, and maintains line-of-sight (LOS) with the mobile device.

14. The method according to claim 9, wherein the substrate is physically connected to the antenna through a microstrip, and the microstrip is mounted on a rear side of the substrate.

15. The method according to claim 9, wherein the substrate is integrated into a rear housing of the mobile device.

16. The method according to claim 9, wherein the substrate is manufactured in a form of a separate cover and mounted on a rear side of the mobile device.

* * * * *